Patented Dec. 15, 1931

1,836,687

UNITED STATES PATENT OFFICE

HENRY B. SMITH, OF ROCHESTER, NEW YORK, ASSIGNOR TO EASTMAN KODAK COMPANY, OF ROCHESTER, NEW YORK, A CORPORATION OF NEW YORK

COMPOSITION OF MATTER CONTAINING CELLULOSE ACETATE AND CARBAMATE

No Drawing.   Application filed August 16, 1930.   Serial No. 475,851.

This invention relates to cellulose acetate compositions, and more particularly to compositions containing cellulose acetate and a plasticizer in such a proportion as will give to the product very high flexibility.

The addition of plasticizers to cellulose acetate for inducing flexibility in the product with which the plasticizer is incorporated has, of course, been practiced for decades and certain of the plasticizers hereinafter mentioned may even have been employed with cellulose acetate in proportions of from 10% to as high as 50%.

The flexibilty of a sheet made from such a composition of matter, for instance, such as photographic film base, is such as permits the sheet to be bent several times but the sheet has little extensibility and without the use of heat or solvents to soften it, it will not conform readily, for instance, to an irregular surface or shape as may well be desired for certain uses.

No one has to my knowledge heretofore incorporated with cellulose acetate the plasticizers herein named in amounts approximately equal to the weight of the cellulose acetate employed, or in other words, approximately 100% of the plasticizer based upon the weight of the cellulose acetate, in order to obtain a more flexible product than that referred to above. Furthermore, it was entirely unexpected that one could incorporate as much as 100% of a plasticizer in a cellulose acetate composition, for the reason that literally hundreds of plasticizers have been found to be incompatible with cellulose acetate in amounts in excess of 50% and frequently in amounts as low as 30% or even 10%; the addition of more than these percentages of the plasticizer merely resulted in the plasticizer crystallizing out, the solution gelling, the product becoming hazy or opaque, or otherwise becoming useless.

I have found that, upon the addition to cellulose acetate of approximately 100% of certain plasticizers, quite unexpected compatibility of the plasticizer with the cellulose acetate exists and also that quite unexpected flexibility, plasticity and clarity of the final product results. Such compositions have great utility where a highly flexible compound is desired, such as the coating of a base (for instance, cloth or other fabric) in the production of artificial leather or the production of relatively thin sheets wherein more than the usual flexibility is important. Such compositions, if converted, for instance, into sheet form will be found to be supple and non-rigid, and to have the ability to conform readily to a surface upon which it may be placed and this even at atmospheric temperatures.

It is among the objects of my invention, therefore, to produce a composition of matter containing cellulose acetate which has a high degree of flexibility, plasticity, extensibility and clarity. It is a further object of my invention to employ certain plasticizers in proportions much higher than heretofore attempted. Other objects of the invention will become apparent from a perusal of the following description.

I have found that it is possible to incorporate with 100 parts of cellulose acetate approximately 100 parts (or in other words approximately 100%) of a substituted or unsubstituted alkyl ester of carbamic acid, such, for instance, as ethyl carbamate which has the formula $NH_2-COOC_2H_5$, ethyl ethyl carbamate which has the formula

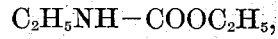
$C_2H_5NH-COOC_2H_5$, or any of the other lower alkyl esters of carbamic acid. This novel composition of matter is produced by merely mixing the plasticizer with cellulose acetate and then adding sufficient of a common solvent, such as acetone (assuming acetone-soluble cellulose acetate is employed), whereupon an intimate mixture of the plasticizer with the cellulose acetate results. The amount of acetone or other common solvent to be employed varies, of course, within rather wide limits depending upon the fluidity of the composition desired. 100 parts of acetone will suffice for many purposes. Various high boilers or evaporation retardents, such as ethyl lactate, amyl acetate or the like may also be added if desired, as is well known in this art.

The composition of matter so produced may then be coated into sheets in the usual way by depositing it upon plates or rolls and permitting the solvent to evaporate. Sheets so produced and having a thickness of approximately 4 or 5 thousandths of an inch were found to withstand as many as 10 or 11 folds as compared to only 2 to 3 folds with a similar sheet to which no plasticizer had been added, the determination of the number of folds being made upon the modified Schopper folding machine widely used in paper testing technology. If my novel composition is to be employed in the manufacture of artificial leather, it may be coated upon, for instance, a cloth support and the solvent permitted to evaporate or the cloth support may be caused to pass through the cellulose acetate-plasticizer composition and permitted to absorb the solution, the solvent in the coating being then permitted to evaporate. In either case, the solvent may, of course, be recovered if desired by condensing the vapors etc.

My novel composition is also useful in the production of molded products as it may readily be cast either from a flowable solution thereof or by pressing or hot pressing the composition containing a lesser amount of common solvent in a mold of the desired shape.

While above and in the claims appended hereto, I have referred to the use of a plasticizer in approximately equal proportions, namely in a ratio of approximately 100%, it will be understood that within this terminology variations of from 10 to 15% less than 100% of plasticizer and as much at 25 to 50% more than 100% of the plasticizer may in some instances be desirable.

Thus it will be observed that I have described a method for the preparation of a product containing cellulose acetate, which product is possessed of unusual flexibility and which is very desirable for use in the production of highly flexible cellulose derivative sheeting or other articles of manufacture and which composition is particularly useful in the production of artificial leather by the coating or impregnation of a support, such as cloth, with my novel composition of matter. Other uses for this composition of matter suggest themselves to those skilled in the various plastic arts.

What I claim as my invention and desire to be secured by Letters Patent is:

1. A composition of matter comprising cellulose acetate and approximately an equal amount of a substituted or unsubstituted alkyl ester of carbamic acid.

2. A composition of matter comprising cellulose acetate and approximately an equal amount of ethyl carbamate.

3. A composition of matter comprising cellulose acetate and approximately an equal amount of ethyl ethyl carbamate.

Signed at Rochester, New York this 6th day of August, 1930.

HENRY B. SMITH.